3,142,711
ACETYLENE POLYMERIZATION CATALYST AND
PROCESS OF USING SAME
Peter S. Bauchwitz, Louisville, Ky., assignor to E. I. du Pont de Nemours and Company, Wilmington, Del., a corporation of Delaware
No Drawing. Filed Feb. 8, 1961, Ser. No. 87,771
9 Claims. (Cl. 260—678)

This invention is directed to the polymerization of acetylene to monovinylacetylene, which is an intermediate in the manufacture of neoprene (polychloroprene). More particularly, this invention is directed to a novel anhydrous catalyst for carrying out the heretofore described polymerization.

It is known that acetylene may be polymerized to monovinylacetylene in solutions of cuprous salts in both aqueous and non-aqueous solvents and that very desirable results are obtained when the solvent is a liquid organic carboxylic amide such as dimethyl formamide and is free from water, as in U.S. 2,875,258. These desirable results are believed to be due in part to absence of water, thus eliminating the formation of oxygen-containing by-products such as acetaldehyde and methylvinylketone. The formation of tarry by-products (believed to be mainly higher polymers of acetylene) is a serious problem when operating at high temperatures and high conversion rates, particularly since there is no means for removing the tar accumulated in the reactor, without stopping operation.

When using an aqueous cuprous chloride catalyst, tar may be removed by having present hydrocarbons or certain diethylene glycol ethers as a second liquid phase (as in U.S. 2,924,631 and 2,914,587) which dissolve the tar. These solvents are not applicable to the carboxylic amide systems, however. When hydrocarbons form the second liquid phase with a catalyst in which the solvent is a liquid carboxylic amide, as in U.S. 2,934,575, the resulting system gives better yields of monovinylacetylene, but is unsatisfactory because most of the tar formed remains in the dimethyl formamide phase and accordingly cannot be removed by removing the hydrocarbon phase. The tar accumulates in the catalyst and increases its viscosity to a point at which it can no longer be used. The diethylene glycol ethers in U.S. 2,914,587 are unsuitable because of their miscibility with the carboxylic amides.

It is an object of the present invention to provide a novel two-phase catalyst active for converting acetylene to monovinylacetylene.

It is a further object of this invention to provide a novel two-phase catalyst for preparing monovinylacetylene wherein the resulting tar becomes concentrated in the phase poor in cuprous chloride.

These and other objects will become apparent in the following description and claims.

More specifically, the present invention is directed to a catalyst for converting acetylene to monovinylacetylene, said catalyst consisting of two phases: (1) a solution of cuprous chloride and a primary or secondary amine hydrochloride containing not more than six carbon atoms, in an anhydrous liquid carboxylic acid amide containing not more than six carbon atoms, said amide amounting to less than 30% by weight of the solution and (2) a monoalkyl ether of a monoethylene glycol containing six to ten carbon atoms in the alkyl radical.

The catalysts of the present invention are most conveniently made by mixing a preformed solution of the catalyst salts in the carboxylic amide, with the alkyl ether. After equilibrium is established between the two phases, the lower layer contains most of the carboxylic amide and catalyst salts and part of the alkyl ether, and the upper layer contains most of the alkyl ether, some of the catalyst salts and carboxylic acid amide. The tar as formed distributes itself between the two phases. The most desirable extenders, from the point of view of tar separation and solvent recovery, are those ethers which extract the most tar and the lowest amounts of carboxylic acid amide and catalyst salts from the original catalyst salt solution.

The solution of cuprous chloride and a hydrochloride of a primary or secondary amine in an anhydrous carboxylic acid amide which forms one phase of the catalyst of the present invention is the catalyst used for making monovinylacetylene from acetylene in U.S. 2,875,258, except that the combined weight percent of the dissolved salts must be 70% or more. Accordingly, reference is made to this patent for information applicable to the present invention as to the nature of the solvent and of the amine hydrochloride, the ratio of hydrochloride to cuprous chloride, the temperature and pressure of operation and the precautions to be observed, such as careful exclusion of water and oxygen. The preferred solvent in the present invention is dimethyl formamide, the preferred amine is monomethylamine, the preferred mole ratio of amine hydrochloride to $Cu_2Cl_2$ is between 1.4 and 1.6 to 1, and the preferred operating temperature is between about 80° and 100° C., but temperatures of 40° and below are satisfactory. Above 110° C., the rate of tar formation increases rapidly. At both higher and lower mole ratios, the yield is materially less. In particular, formamide and acetamide may be substituted for dimethylformamide.

The class of ethers forming the second phase and thus extending the catalyst has been defined. The monoglycol ethers having alkyl groups with eight carbons are preferred over those with more or fewer carbons, on the basis of both higher productivity, higher solvent power for tar and lower solvent power for the catalyst salts. The 2-ethylhexyl ether of ethylene glycol is especially preferred. Other suitable but less preferred ethers are normal hexyl, normal octyl, trimethylhexyl and isodecyl. The corresponding ethers of diethyleneglycol behave similarly but less effectively. Minor proportions of these, up to 25% may be used, however, if desired. The ratio of glycol ether to solution of catalyst salts in carboxylic acid amide, by volume, before mixing, is usually between 1:2 and 3:1 preferably about 3:2, although higher and lower ratios are operable.

Representative examples illustrating the present invention follow.

EXAMPLE 1

*Monethylene Glycol Mono(2-Eethylhexyl)Ether as Extender*

The catalyst is made by dissolving $Cu_2Cl_2$ and $CH_3NH_2 \cdot HCl$ in the ratio of one mole of the former to 1.68 mole of the latter in dimethyl formamide so as to give a 78% solution of the salts with a specific gravity of 1.580 at 78° C. Moisture and air are carefully excluded and copper powder is added to reduce any cupric to cuprous chloride; 200 ml. of this catalyst mixture (measured at 78° C.), and 200 ml. of the monoethylene glycol mono(2-ethylhexyl)ether (measured at 25° C.) are then placed in a glass tube about 56 cm. high and 5 cm. in diameter. This tube is kept at 100° C. by means of a jacket through which either hot water or steam can be circulated. Acetylene is introduced at the base of the column of catalyst, as a stream of fine bubbles, slightly above atmospheric pressure, and at a rate of 800 ml. per minute for 69.5 hrs. The total acetylene introduced is 3,480 g. The ether extender is only partly miscible with the salt solution and is kept well dispersed by the agitation furnished by the rising bubbles. The exit gas is analyzed for monovinyl acetylene by infrared absorption or by vapor-phase chromatography. The tar formed during the passage of the acetylene remains dissolved in the catalyst and is allowed to accumulate. At the end of the reaction, the catalyst is allowed to separate into two layers by stopping the introduction of gas. The lower layer, from which part of the dimethyl formamide and part of the catalyst salts have been extracted by the ether, is analyzed for tar by pouring into dilute hydrochloric acid, collecting, washing and drying the precipitated tar, analyzing the latter for residual copper, chlorine, and nitrogen, calculating the corresponding catalyst salt content, and from this the "pure" tar content. The upper layer, consisting of the ether extender, tar and some of the dimethyl formamide and catalyst salts, is analyzed by distilling the volatile components as 1–3 mm. of mercury, washing the residual tar with dilute hydrochloric acid to remove most of the catalyst salts, and then determining the residual catalyst salts and "pure" tar as already described.

After the passage of the acetylene for 69.5 hrs., as described above, the lower or catalyst layer, 328 g., contains 18.2 g. or 5.5% tar and the upper or extender layer, 148 g., contains 9.8 g. or 6.6% tar, 14.6 g. or 9.9% of the catalyst salts (cuprous chloride and methylamine-hydrochloride) and 0.7 g. or 0.5% of dimethyl formamide dissolved in ether.

The gas leaving the catalyst during the 69.5 hr. run contains 728 g. of monovinylacetylene and 101 g. of divinylacetylene, the rest being essentially acetylene and small amounts of solvent vapor. The conversion of the acetylene to all polymers (including tar) is therefore 24.6%. The yield of monovinylacetylene is 85.1% and the productivity is 26.2 g. of monovinylacetylene per hr. per liter of catalyst, including the extender.

In a control experiment in which all conditions are the same except that no ether is added, the acetylene conversion is only 10.6%, the yield only 69.5% and the productivity 18.4 g. The tar dissolved in the catalyst is 6 g., while an additional 4 g. is deposited on the walls of the apparatus. The amount of tar formed for each 100 g. of monovinylacetylene is thus about the same.

In another comparative experiment, to demonstrate the improvement over the process of U.S. 2,934,575, 200 ml. of mineral spirits, a refined petroleum fraction boiling at 190–200° C., replaces the ether extender of this example. The acetylene conversion is only 8.9%, but the yield 77.5%. The total tar formed is only 3.4 g. but only 1.4 g. of this is in the hydrocarbon phase, the larger part of it remaining in the catalyst phase and causing it to increase rapidly in viscosity and finally become too viscous to operate.

Returning now to Example 1, the upper layer is subjected to vacuum distillation, yielding, as distillate, ether and dimethyl formamide, both of which may be re-used, and, as residue, a mixture of tar and catalyst salts, from which the latter are recovered for re-use by aqueous hydrochloric acid extraction. Another procedure is to add water to the upper layer to precipitate the tar and to extract the ether and dimethyl formamide from the resulting water layer with petroleum ether.

It will be seen that the procedure of Example 1 provides an effective method for separating the tar formed in the catalyst and thus preventing its accumulation in the catalyst and making possible the operation of the catalyst for very long periods. Furthermore, the catalyst and process of the example give a very substantial improvement in both conversion and yield (ordinarily one cannot be increased without decreasing the other), in comparison with the same catalyst to which no ether has been added. Moreover, the productivity of the catalyst is actually greatly increased, in spite of the great dilution of the active ingredient. In comparison with the catalyst containing a hydrocarbon instead of the ether, the removal of the tar by the ether is much more effective and the conversion and productivity are both much greater.

When diethylene glycol monohexyl ether is substituted for the monoethylene glycol mono(2-ethylhexyl)-ether of this example, much less tar and much more of the catalyst salts are extracted by the extender. Both of these results are, of course, undesirable.

EXAMPLE 2

*Monoethylene Glycol Mono(2-ethylhexyl)Ether as Extender*

The catalyst is made as in Example 1 with the mole ratio of methylamine-hydrochloride to $Cu_2Cl_2$ equal to 1.58, the salt concentration 78% and the specific gravity 1.576 at 80° C. 200 milliliters of this solution (measured at 80° C.) is mixed with 200 ml. (measured at 25° C.) of ethylene glycol mono(2-ethylhexyl)ether in the reactor described in Example 1. Acetylene is introduced at 400 ml. per min. for 48 hrs. This lower rate is chosen so as to accentuate the tar formation. The total acetylene introduced is 1,212 g. The ether disperses in the catalyst salt solution as a result of the upward passage of the acetylene as in Example 1.

The gas leaving the catalyst contains a total of 310 g. of monovinylacetylene and 89 g. of divinylacetylene, and the catalyst and extender phases contain 23 g. of tar. The conversion is 34.7%, the yield of monovinylacetylene is 73.5% and the productivity of the whole catalyst is 16.0 g. of monovinylacetylene per hr. per liter. The portion of the total tar in the upper layer (extender phase) is 91.5%. The phase, 233 g., contains 9.1% tar and 10% of catalyst salts. The lower layer (catalyst phase), 227 g., contains about 1% of tar.

EXAMPLE 3

*Monoethylene Glycol Monoisodecyl Ether*

Example 2 is repeated except that monoethylene glycol monoisodecyl ether is used in place of an equal quantity of 2-ethylhexyl ether. The results are similar except that the conversion and productivity in the present example are somewhat lower (31.4% and 14.5 g.), and the concentration of catalyst salts in the extender phase is somewhat more (12%).

EXAMPLE 4

*Monoethylene Glycol Monohexyl Ether*

The conditions of Example 1 are repeated and monoethylene glycol monohexyl ether is used as extender. Results are similar except that the concentration of catalyst salts in the extender phase is 18% and the tar concentration is 9.0%.

The following examples illustrate an advantageous process for removal of tar and regeneration of the catalyst, in connection with the use of the catalysts (heretofore described) in making monovinylacetylene. The water added to precipitate the tar from the upper (extender) phase of the catalyst may be acidified, preferably with hydrochloric acid, to aid in reducing the amount of cuprous chloride remaining in the tar. The presence of acid, however, has the disadvantage of causing some hydrolysis of the dimethyl formamide. The most advantageous ratio of water to upper phase of the catalyst is about 1:1 by weight, that is, between 2:3 and 3:2. Much smaller proportions of water fail to give any precipitation of tar and larger proportions give no advantages which counterbalance the disadvantages of having to distill the large amounts of water. The temperature at which the separation into layers is made is conveniently between 70° and 100° C. It may be advantageous to add dimethylformamide to the extender phase to make sure that the catalyst salts remain in solution. The removal of part of the catalyst for tar removal may be either continuous or batch wise as needed.

EXAMPLE 5

*Continuous Operation With Tar Removal and Catalyst Recovery*

The catalyst is made by dissolving monomethylamine hydrochloride and cuprous chloride in a weight ratio of 53:27 (1.5 mol of hydrochloride per mol of $Cu_2Cl_2$) to give an 80% solution by weight in dimethylformamide and mixing this solution with monoethylene glycol mono (2-ethylhexyl)ether in a ratio by volume of 40:60. The reactor is a horizontal copper cylinder agitated by blades rotated about a central horizontal shaft. This is charged with about 2 gallons of this catalyst and maintained at 90° C. Acetylene at 45 lbs. per sq. in. gauge pressure is passed horizontally through the reactor. When acetylene is fed at 20 lbs. per hr., monovinylene acetylene is formed at a rate of 3 lbs. per hr., along with divinylacetylene at 0.175 lb. per hr. and tar at 0.009 lb. per hr. The yield at this 15% conversion is 94%.

A stream of catalyst is removed continuously from the reactor, after a concentration of tar has formed therein, at a rate of 191 parts of weight per hour. This stream contains 11.4 parts of tar. It is allowed to separate into two layers at 90° C. and the lower layer, consisting of catalyst solution containing 6.7 parts of tar, is recycled to the reactor. The upper layer, consisting of 9.4 parts of the catalyst salts and 4.7 parts of tar in 70 parts of the extender and 9.4 parts of dimethylformamide is mixed with 94 parts of water at 100° C. Three layers are formed on settling. The lowest, consisting of 3.7 parts of tar and 3.7 parts of catalyst salts in 1.9 parts of extender, 0.9 part of dimethylformamide and 1.0 part of water is separated, diluted with toluene for easier handling, and sent to a burner or other disposal device. The two upper layers, containing most of catalyst salts and extender, are combined and diluted with 4 parts of dimethylformamide per hour to keep the catalyst salts in solution and continuously distilled at 170° C. and 140 mm. pressure, yielding a distillate containing all the water and 2 parts of dimethylformamide and a residue consisting of the catalyst salts, 5.6 parts, dissolved with 1.0 part of tar, in 68 parts of extender and 10 parts of dimethylformamide. This solution is anhydrous and may therefore be returned to the catalyst after making up the small amounts of catalyst salts and solvents removed with the tar and distillate. The distillate may be combined with similar streams produced for example in the purification of acetylene produced by pyrolysis, and distilled for the recovering of the dimethylformamide in anhydrous form.

Instead of the horizontal reactor used in this example, the sieve-plate tower reactor described in U.S. 2,795,985 may be used to advantage, particularly in production on a large scale.

The catalyst of the present invention, in addition to giving significantly high yields, high conversions, and high productivities, gives a basis for solving the problem of tar accumulation. The use of such a catalyst is particularly advantageous when used in the process wherein a solution of acetylene in an organic solvent is passed countercurrent to a mixture of acetylene and monovinylacetylene, obtained by passing acetylene through a cuprous chloride catalyst, with the formation of a stream of pure acetylene for recirculation to catalyst and a solution of monovinylacetylene, from which the latter is easily recovered in pure form. Obviously, great complications arise if different solvents are used in the catalyst and in the absorption step. Dimethylformamide and related liquid carboxylic amides containing not more than six carbon atoms are among the most effective in the absorption step. Hence, catalyst of the present invention is particularly well adapted for use in connection with this process.

It is understood that any of the designated representative ether extenders may be substituted in the preceding examples to give essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A non-aqueous catalyst for converting acetylene to mono-vinylacetylene, said catalyst consisting of two phases made by combining: (1) a solution of cuprous chloride and an amine hydrochloride selected from the group consisting of primary and secondary amine hydrochlorides containing not more than six carbon atoms, in an anhydrous liquid carboxylic acid amide containing not more than six carbon atoms, said amide amounting to less than 30% by weight of said solution and (2) a monoalkyl ether of monoethylene glycol containing from six to ten carbon atoms in the alkyl radical.

2. A process for making monovinylacetylene by passing acetylene through a non-aqueous catalyst consisting of two phases made by combining (1) a solution of cuprous chloride and an amine hydrochloride selected from the group consisting of primary and secondary amine hydrochlorides containing not more than six carbon atoms, in an anhydrous liquid carboxylic acid amide containing not more than six carbon atoms and (2) a monoalkyl ether of a monoethylene glycol containing from six to ten carbon atoms in the alkyl radical, followed by recovering monovinylacetylene from the resulting exit gas, removing the tar formed in the catalyst by allowing said catalyst to separate into two layers, separating the lower layer comprising the catalyst salt dissolved in the carboxylic acid amide and separating the tar and the alkyl ether from the upper layer.

3. A catalyst according to claim 1 wherein the amine hydrochloride is monomethylamine hydrochloride.

4. A catalyst according to claim 1 wherein the carboxylic acid amide is dimethylformamide.

5. A catalyst according to claim 1 wherein the monoalkylether is the 2-ethylhexyl ether of monoethylene glycol.

6. A process according to claim 2 wherein the volume ratio of the glycol ether to the solution of catalyst salts in carboxylic acid amide, before mixing, is between 1:2 and 3:1.

7. A process according to claim 2 wherein the mole ratio of said amine hydrochloride to said cuprous chloride is between 1.4:1 and 1.6:1.

8. A process according to claim 2 conducted at an operating temperature of 80° to 100° C.

9. A process according to claim 2, wherein said monoalkyl ether of a monoethylene glycol contains a minor proportion of a monoalkyl ether of a diethylene glycol containing from six to ten carbon atoms in the alkyl radical.

References Cited in the file of this patent

UNITED STATES PATENTS

| | | |
|---|---|---|
| 1,926,039 | Downing et al. | Sept. 12, 1933 |
| 2,202,919 | Perlick et al. | June 4, 1940 |
| 2,227,478 | Wolfram et al. | Jan. 7, 1941 |
| 2,857,435 | Gonzalez | Oct. 21, 1958 |
| 2,914,587 | Crancer et al. | Nov. 24, 1959 |
| 2,934,576 | Goffinet | Apr. 26, 1960 |